Sept. 7, 1965  H. R. GRÖZINGER  3,204,719
IDLING SPEED CONTROL SYSTEM
Filed Oct. 30, 1962
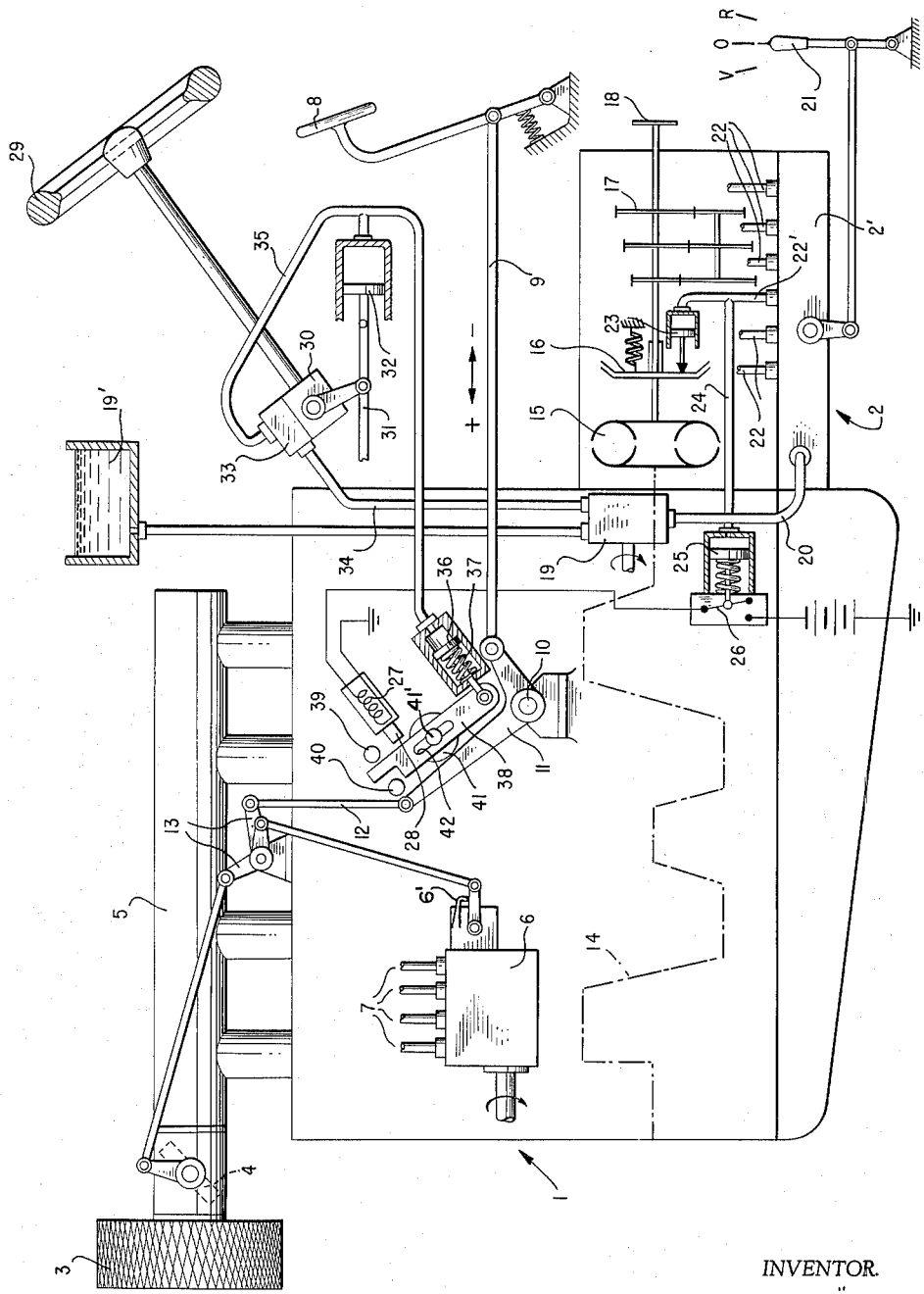
INVENTOR.
HANS R. GRÖZINGER
BY
*Dicke & Craig*
ATTORNEYS

United States Patent Office 3,204,719
Patented Sept. 7, 1965

3,204,719
IDLING SPEED CONTROL SYSTEM
Hans R. Grözinger, Stuttgart-Bad Cannstatt, Germany, assignor to Daimler-Benz Aktiengesellschaft, Stuttgart-Untertürkheim, Germany
Filed Oct. 30, 1962, Ser. No. 234,202
Claims priority, application Germany, Nov. 4, 1961,
D 37,386
8 Claims. (Cl. 180—77)

The present invention relates to a control system for the idling-speed torque of internal combustion engines which cooperate with transmissions, preferably automatic transmissions, containing hydrodynamic transmission devices especially in motor vehicles.

With such types of transmissions, a force-transmitting position is selected or engaged during starting under load whereby the hydrodynamic transmission element at first operates with 100% slippage and in this manner opposes quite a considerable resistance to the internal combustion engine. If additional gas is not given instantly, then there exists the danger that the normal idling-speed torque does not suffice to overcome the resistance and the internal combustion engine stalls.

For purposes of eliminating these drawbacks, it is proposed in accordance with the present invention to provide an installation for the adjustment of the idling-speed torque of the engine to a larger value upon selection or engagement of a force-transmitting position of the transmission. With such an installation, for example, a motor vehicle is able to remain at standstill, without stalling the engine, even after selection or engagement of the "drive" position of the automatic transmission provided with a hydrodynamic coupling while the brake remains applied or pulled up.

The present invention may be realized in a simple manner by so arranging the installation for the increase in torque that, for purposes of increasing the torque, it acts on the control linkage operatively connected with the gas pedal, especially in the form of an adjustment of an idling-speed abutment. According to a further feature of the present invention, there may be used, for purposes of controlling of the installation for increasing the torque, a hydraulic pressure utilized within the transmission for shifting purposes or force-transmission purposes which acts on the torque control system either mechanically by way of a piston or the like or electrically by way of a switch and an electro-magnet.

In a motor vehicle provided with a hydrualic auxiliary-force power steering, there arises at the moment at which the auxiliary-force of the power steering becomes effective, that is, with a steering deflection of the wheels or after exceeding a predetermined magnitude of the steering deflection, a considerable requirement for pressure medium energy. This requirement for pressure medium energy has to be supplied by the pressure medium pump driven by the internal combustion engine. Consequently, also in this case, there exists the danger that, insofar as the internal combustion engine operates under idling conditions, the internal combustion engine is stalled by the relatively larger load.

For purposes of avoiding this drawback, it is additionally proposed, in accordance with the present invention, to adjust the idling-speed torque to a larger value not only in dependence on a force-transmitting position of the change-speed transmission, but also in dependence on a force-transmitting position of the auxiliary-force steering system. The arrangement may thereby be so made that one adjusting member each, influenced or operatively connected with the transmission and the auxiliary force-steering system respectively, acts on a lever which transmits the movements of the adjusting members, especially with the aid of an adjustable transmission element, to the torque control linkage.

Accordingly, it is an object of the present invention to provide an idling-speed torque control installation for internal combustion engines which eliminates, by simple means, the shortcomings and drawbacks encountered in the prior art constructions.

It is another object of the present invention to provide an idling speed control system for internal combustion engines which automatically adjusts the idling speed torque supplied by the engine to a larger value when the transmission, provided with a hydrodynamic device, is shifted into a force-transmitting position.

Still a further object of the present invention resides in the provision of an idling speed torque-control installation for internal combustion engines which prevents, in an extremely reliable and safe manner, the stalling of the engine when considerable resistance is opposed to the engine during starting of the vehicle at which time the hydrodynamic device normally operates at 100% slippage especially with continuing application of the brakes.

A further object of the present invention resides in the provision of an idling speed control installation for motor vehicles which is effective to prevent stalling of the engine during idling thereof when a sudden load of a given nature is applied thereto that is not compensated by depressing of the gas pedal by the driver.

These and further objects, features and advantages of the present invention will become more obvious from the following description when taken in connection with the accompanying drawings which shows, in the single figure thereof, for purposes of illustration only, one embodiment in accordance with the present invention.

Referring now to the drawing which illustrates the idling-speed torque control installation in accordance with the present invention on hand of a mixture-compressing fuel-injection type internal combustion engine, reference numeral 1 generally designates therein the internal combustion engine which, for purposes of driving a motor vehicle, is provided with an automatic transmission generally designated by reference numeral 2.

The combustion air reaches the common intake pipe or manifold 5 by way of a filter 3 past a throttle valve 4. An injection pump 6 driven by the internal combustion engine supplies the fuel to the combustion spaces by way of lines 7. The torque regulation or adjustment of the engine takes place from the gas pedal 8 which actuates by way of linkage 9 a bell crank 11 supported at the engine at 10 which bell crank 11 is operatively connected, in turn, by way of rod 12 with the bell crank 13. The movements of the bell crank 13 are transmitted, on the one hand, to the throttle valve 4 and, on the other, to the control rack of the injection pump 6.

A hydrodynamic coupling 15 is driven by the crankshaft 14 of the internal combustion engine 2. A mechanical clutch 16 is operatively connected to the rear, i.e., to the output of the coupling 15. Following the clutch 16 is a countershaft transmission 17 which includes an output 18 for driving the wheels of the vehicle. Of course, any suitable hydrodynamic device, clutch and change-speed gear of known construction may also be substituted in the present invention for those illustrated herein.

An oil pump 19 driven by the internal combustion engine, which is operatively connected with an oil tank 19', supplies pressure oil to the transmission 2 by way of a line 20. The pressure oil is utilized, on the one hand, for the hydrodynamic force-transmission within coupling 15 and, on the other, for the actuation of the individual shifting operations within the transmission 2. Below the transmission, properly speaking, there is arranged the valve box 2' provided with the shifting and control installations for the transmission. A selector lever 21 effects the individual shifting positions within the valve box 2'. For sake of simplicity, only three positions, namely the forward, neutral and rearward positions are indicated in the drawing. Pressure oil lines 22 supply the pressure oil to the individual force-transmitting places and shifting places of the transmission. Illustrated in greater detail, however, is a line 22' which leads to a pressure piston 23 for the engagement of the clutch 16. A line 24 branches off from this line 22'. The line 24 leads to a pressure piston 25 which actuates an electric switch 26. The switch 26 is connected in a circuit including the electro-magnet 27. The amature pin 28 of the electro-magnet 27 is shown in the illustrated position in the normal rest position thereof and during flow of current through the engergizing winding of the electro-magnet 27 moves outwardly, that is downwardly toward the left in the drawing. Of course, it is also within the scope of the present invention to place the pressure piston 25 in the place of the electro-magnet 27 in order to save electric current, that is, to save in the electric auxiliary force.

A rod 31 leading to the steering links of the wheels is moved to and fro from the steering wheel 29 by way of a steering gear 30 of conventional construction. The movements of the rod 31 are aided by a pressure piston 32 as is well known in connection with power steering systems. The control for the power steering system and more particularly the control of the pressure oil necessitated therefor takes place in dependence on the deflection of the steering wheel 29 within a control apparatus 33 of conventional construction to which is supplied pressure oil from the pump 19 by way of line 34. Of course, a separate pressure oil system may also be provided for that purpose. The oil thereupon reaches, by way of line 35, the piston 32 and also a pressure piston 36 which is normally pressed into the abutment position thereof as shown in the drawing, by a compression spring 37. A lever 38 is pivotally secured at the rod of the piston 36, the movements of the lever 38 being limited by two abutments 39 and 40 fast to the engine. Within the center region, a transmission roller 41 serving as a secondary idling abutment is adjustably secured at the lever 38 for adjustment of the pivot axis thereof with the aid of guide means 42 in the form of an elongated aperture. The roller 41 is secured at selected positions within the slot 42 by an adjustable fastening member 41'. For purposes of adjustment of the installation, both the pin 28, effective as an adjusting member, as well as the piston rod of the pressure piston 36, also effective an as adjusting member, are adjustable in the length thereof.

*Operation*

The operation of the control installation in accordance with the present invention is as follows:

In the drawing, the position of the various parts of the control installation is illustrated in the normal idling condition of the internal combustion engine. The control linkage cooperating with the gas pedal 8 thereby abuts against an idling speed abutment 6' on the injection pump 6 and releases the necessary air and fuel quantity at the throttle valve 4 and at the injection pump 6 respectively. As a result thereof, normal idling is assured.

If the selector lever 21 is displaced, for example, from neutral to the "forward" or "driving" position, then pressure oil is applied to the piston 23 and the clutch 16 is engaged. The internal combustion engine now has to supply the entire energy which is necessitated within the coupling 15 of which the secondary or right part is at a standstill as the vehicle has not yet begun to move. It is thereby also assumed as an aggravating circumstance that the brakes are still applied and the vehicle is not as yet even capable of beginning to move. The flow resistance within the coupling 15 at 100% slippage would normally cause the engine to stall if additional fuel and air were not supplied thereto. This adjustment, however, takes place by the pressure oil present within line 22' closing the switch 26 by way of line 24 and piston 25. As a result thereof, the energizing circuit of the electro-magnet 27 is closed and the amature pin 28 is forced downwardly toward the left whereby the pin 28 also displaces both the lever 38 and the roller 41 downwardly toward the left. It becomes quite apparent from the drawing that the injection pump 6 and a throttle valve 4 are adjusted thereby in the sense of a larger torque supplied from the internal combustion engine. The lever 38 thereupon abuts against the abutment 40.

An increase in the idling-speed torque should also take place, even if the transmission selector lever 21 is in the neutral position and no slippage takes place within the coupling 15 as the clutch 16 is still disengaged, under those conditions, when the steering gear 29 is actuated. In that case, the control apparatus 33 opens up to the pressure oil derived from line 34 the path to the line 35 whereby, on the one hand, the piston 32 aids the steering movement, and, on the other, the piston 36 is moved downwardly toward the left as viewed in the drawing. As a result thereof, one end of the lever 38 abuts against the abutment 39 and thereupon forces the bell crank 11 by way of roller 41 downwardly toward the left, i.e., in the counterclockwise direction. This in turn, causes an increase in the idling-speed torque supplied by the engine in the same manner as described hereinabove. Obviously, if both the power steering and the transmission are actuated at the same time, a combined displacement of the lever 38 in accordance with the above description will occur.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. A control installation for the idling-speed torque of internal combustion engines, especially in motor vehicles, which cooperate with transmissions utilizing a hydraulic pressure medium, containing hydrodynamic transmission elements and adapted to be shifted to a force-transmitting position in which torque is transmitted through the hydrodynamic transmission elements, comprising control means including a gas pedal operatively connected with linkage means for adjusting the engine torque and primary idling abutment means for maintaining said control means at least at a minimum idling position, secondary idling speed abutment means for said linkage means, and further means operable by said hydraulic pressure medium and operatively connected with said linkage means to adjust said secondary idling abutment means to a position of larger value in the idling-speed torque of the engine upon engagement of a force-transmitting position within the transmission, said further means including hydraulically actuated switch means and electromagnet means for electrically influencing said secondary idling-speed abutment means.

2. For use with an internal combustion engine having control means including a control linkage for adjusting the engine torque, especially in motor vehicles provided with power steering means adapted to be actuated to a force-transmitting position in which the auxiliary force means thereof is rendered effective, and provided with a transmission having a hydrodynamic device and shifting means for selectively shifting the transmission to a force-transmitting position in which is transmitted through the hydrodynamic device, the improvement essentially consisting of a control installation for adjusting the idling-speed torque of the, engine comprising means in the form of a lever pivotable against said control linkage for adjusting said control means to a larger value in the idling speed torque of the engine, said lever being actuated in a compound manner in response to engagement of a force-transmitting position in the transmission and the power steering means.

3. For use with an internal combustion engine having control means for adjusting the engine torque, especially in motor vehicles provided with power steering means adapted to be actuated to a force-transmitting position in which the auxiliary force means thereof is rendered effective, and provided with transmission means having a hydrodynamic device and shifting means for selectively shifting the transmission means to a force-transmitting position in which torque is transmitted through the hydrodynamic device, the improvement essentially consisting of a control installation for adjusting the idling-speed torque of the engine comprising adjusting means operatively connected with said control means for adjusting said control means to a larger value in the idling speed torque of the engine in dependence upon engagement of a force-transmitting position in the transmission means, said adjusting means including one adjusting member each effectively actuated by said power steering means and said transmission means, respectively, a lever actuated by said adjusting members, and means for transmitting the adjusting movements of said lever to said control means.

4. For use with an internal combustion engine having control means for adjusting the engine torque, especially in motor vehicles provided with power steering means adapted to be actuated to a force-transmitting position in which the auxiliary force means thereof is rendered effective, and provided with a transmission means having a hydrodynamic device and shifting means for selectively shifting the transmission means to a force-transmitting position in which torque is transmitted through the hydrodynamic device, the improvement essentially consisting of a control installation for adjusting the idling-speed torque of the engine comprising adjusting means operatively connected with said control means for adjusting said control means to a larger value in the idling speed torque of the engine in dependence upon engagement of a force-transmitting position in the transmission means or in the power steering means, said adjusting means including one adjusting member each effectively actuated by said power steering means and said transmission means, respectively, a lever actuated by said adjusting members, and means including an adjustable transmission element for transmitting the adjusting movements of said lever to said control means.

5. For use with an internal combustion engine having control means for adjusting the engine torque, especially in motor vehicles provided with power steering means adapted to be actuated to a force-transmitting position in which the auxiliary force means thereof is rendered effective, and provided with automatically-operable change-speed transmission means having a hydrodynamic device and shifting means for selectively shifting the transmission means to a force-transmitting position in which torque is transmitted through the hydrodynamic device, the improvement essentially consisting of a control installation for adjusting the idling-speed torque of the engine comprising adjusting means operatively connected with said control means for adjusting said control means to a larger value in the idling speed torque of the engine in dependence upon engagement of a force-transmitting position in the transmission means or in the power steering means, said adjusting means including one adjusting member each effectively actuated by said power steering means and said transmission means, respectively, a lever actuated by said adjusting members, and means including an adjustable transmission element in the form of a roller having an adjustable axis for transmitting the adjusting movements of said lever to the control linkage formed by said control means.

6. A control installation for the idling-speed torque of internal combustion engines, especially in motor vehicles, which cooperate with transmissions utilizing a hydraulic pressure medium, containing hydrodynamic transmission elements and adapted to be shifted to a force-transmitting position in which torque is transmitted through the hydrodynamic transmission elements, comprising control means including a gas pedal operatively connected with linkage means for adjusting the engine torque, idling speed abutment means for said linkage means, hydraulically actuated switch means operable by said hydraulic pressure medium in response to engagement of a force-transmitting position within said transmission, electrical circuit means including an electro-magnet responsive to said hydraulically actuated switch means for adjusting said abutment means to a position of larger value in the idling-speed torque of the engine.

7. A control installation for the idling-speed torque of internal combustion engines, especially in motor vehicles provided with power steering means adapted to be actuated to a force-transmitting position in which the auxiliary force means thereof is rendered effective, and containing hydrodynamic transmission elements and adapted to be shifted to a force-transmitting position in which torque is transmitted through the hydrodynamic transmission elements comprising control means including a gas pedal operatively connected with linkage means for adjusting the engine torque, idling speed abutment means for said linkage means, first hydraulically actuated switch means operable by said hydraulic pressure medium in response to engagement of a force-transmitting position within said transmission, electrical circuit means including an electro-magnet means responsive to said hydraulically actuated switch means for adjusting said abutment means to a position of larger value in the idling-speed torque of the engine, second hydraulically actuated means connected to said abutment means and actuated by said power steering means in response to actuation of said power steering means to said force transmitting position for adjusting said abutment means to a position of larger value in the idling speed torque of the engine.

8. A control installation as defined in claim 7, wherein said abutment means includes a lever having said second hydraulically actuated means pivotally connected at one end thereof and said first hydraulically actuated switch means operatively associated with the other end thereof so as to pivot said lever about said one end in response to activation of said circuit means.

References Cited by the Examiner

UNITED STATES PATENTS

| | | | |
|---|---|---|---|
| 2,229,055 | 1/41 | Dick | 192—.084 |
| 2,296,646 | 9/42 | Matulaitis | 180—77 X |
| 2,913,921 | 11/59 | Gordon | 180—77 X |
| 2,929,226 | 3/60 | Baker et al. | 180—77 X |
| 2,940,336 | 6/60 | Simpson et al. | 74—472 X |
| 2,997,144 | 8/61 | Gsching et al. | 74—472 |
| 3,022,849 | 2/62 | Braun | 180—77 |
| 3,042,134 | 7/62 | Majewski | 180—77 |

FOREIGN PATENTS

| | | |
|---|---|---|
| 858,765 | 1/61 | Great Britain. |
| 874,522 | 8/61 | Great Britain. |

MILTON BUCHLER, *Primary Examiner.*

A. HARRY LEVY, *Examiner.*